United States Patent [19]
Wokas

[11] Patent Number: 5,244,307
[45] Date of Patent: Sep. 14, 1993

[54] ANTI-POLLUTION PIPING AND DISPENSING SYSTEM

[76] Inventor: Albert L. Wokas, 5815 Dew Ct., Rocklin, Calif. 95677

[21] Appl. No.: 566,603

[22] Filed: Aug. 13, 1990

[51] Int. Cl.⁵ .............................................. F16L 1/00
[52] U.S. Cl. .................................... 405/53; 405/52; 405/128
[58] Field of Search ............... 405/52, 53, 128, 303; 73/49.2 T; 55/88

[56] References Cited

U.S. PATENT DOCUMENTS

| | | | |
|---|---|---|---|
| 2,853,149 | 9/1958 | Gosselin | 55/88 X |
| 3,193,990 | 7/1965 | Smith | 55/88 X |
| 3,672,180 | 6/1972 | Davis | 55/88 X |
| 3,926,230 | 12/1975 | Stary et al. | 55/88 X |
| 4,010,779 | 3/1977 | Pollock et al. | 55/88 X |
| 4,778,310 | 10/1988 | Moreland | 405/53 X |
| 4,787,772 | 11/1988 | Wagner | 405/53 |
| 4,885,931 | 12/1989 | Horner | 73/49.2 T |
| 4,968,179 | 11/1990 | Frahm | 405/52 X |
| 4,978,249 | 12/1990 | Killman | 405/303 |
| 5,037,239 | 8/1991 | Olsen et al. | 405/128 |

FOREIGN PATENT DOCUMENTS

0188929 8/1987 Japan .................. 73/49.2 T

Primary Examiner—Dennis L. Taylor
Attorney, Agent, or Firm—Harness, Dickey & Pierce

[57] ABSTRACT

A system of above grade piping for distributing product from underground storage tanks to dispensers, plus a means to contain and capture surface spills and direct same into an oil-water separator that is built into and is part of the underground storage tank.

16 Claims, 8 Drawing Sheets

COMBINATION UNDERGROUND STORAGE TANK & OIL-WATER SEPARATOR

CYLINDRICAL OIL-WATER SEPARATOR
INSIDE UNDERGROUND STORAGE TANK

ANTI-POLLUTION PIPING AND DISPENSING SYSTEM

BRIEF SUMMARY OF THE INVENTION

This invention relates to the elimination of ground pollution from underground tank storage and dispensing system caused for example, by spills, overflows, and piping failures due to installation mistakes, excessive surface loads, stress of underground movement and corrosion.

EPA studies show that most leaks result from piping failure. In addition to leak from tanks and piping, spills and overfills cause many releases into the ground.

The solution to the pollution problem caused by service station, truck stop, commercial and industrial underground tank piping systems, proposed by the present invention, is to eliminate the underground pipe plus contain and recover surface spills.

Figure 1:
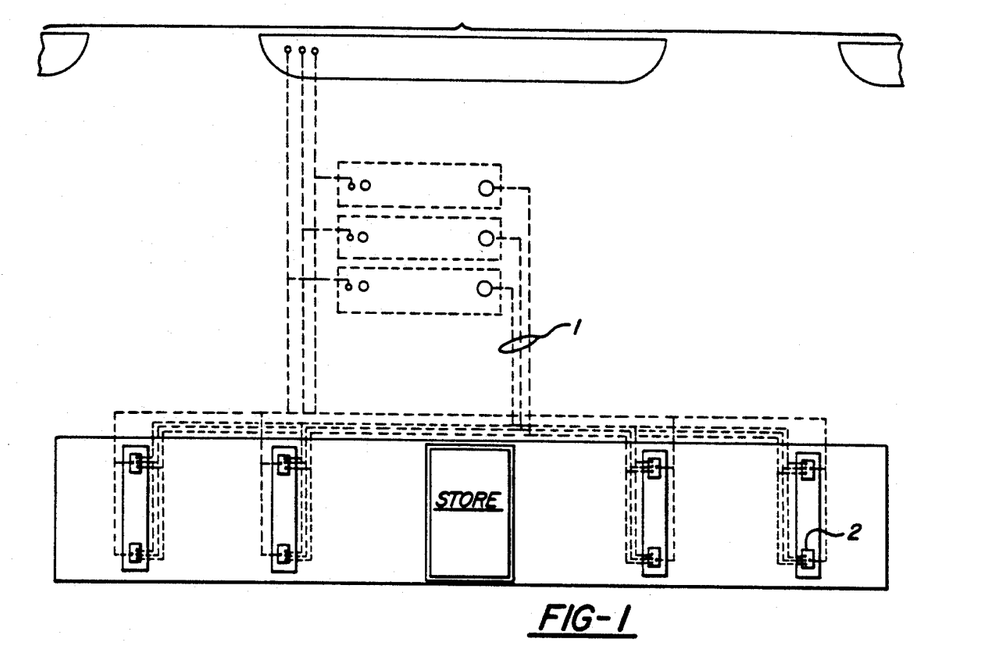
FIG. 1 is a plan view of a conventional multi-island service station and underground piping.
Figure 2:
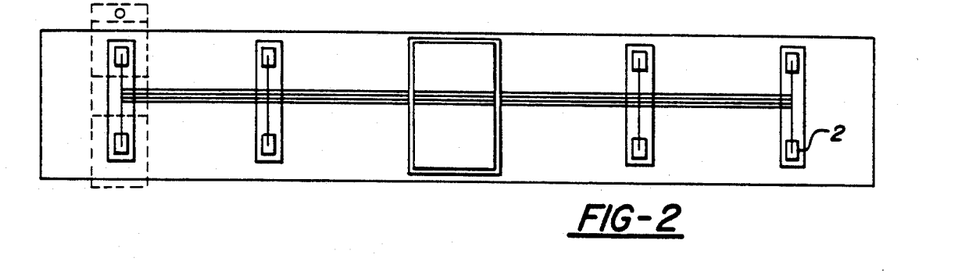
FIGS. 2, 3, 4 and 5 are plan views of a service station with overhead piping in the canopy according to one preferred embodiment of the present invention.
Figure 3:
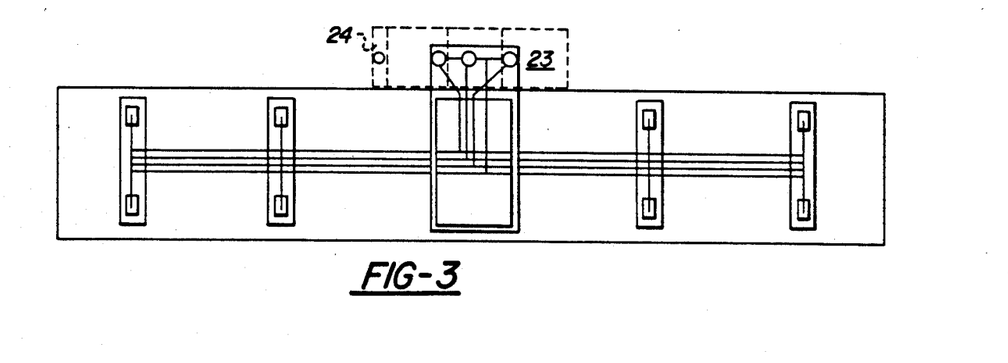
Figure 4:
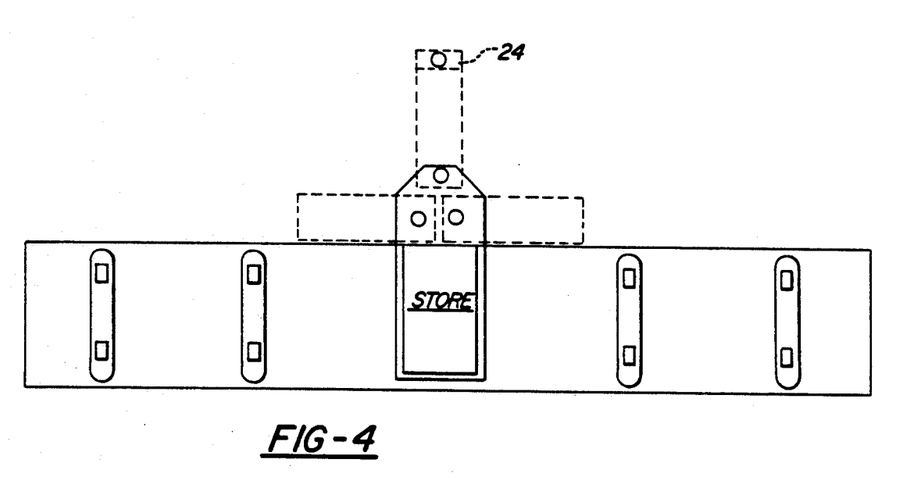

This is done by departing from the practice of putting underground storage tanks in a remote location (see FIG. 1) which requires long runs of pressurized underground pipe 1 to reach the dispensing equipment 2. This major reorientation of tank positioning (see FIGS. 2, 3, 4, and 5) permits a total new and flexible, no underground pipe system, to be used.

The universally common practice of installing canopies over the pump islands enhances the no underground pipe system. By locating a compartmented tank under one island (see FIG. 2) or a T-formation (see FIG. 3) adjacent to and under one end of a extended island or using a cluster of individual tanks set in a T-formation (see FIGS. 4 and 5) with one end of each tank under an extended island, the no under ground pipe dispensing system is realized.

DESCRIPTION OF THE INVENTION

Figure 6:
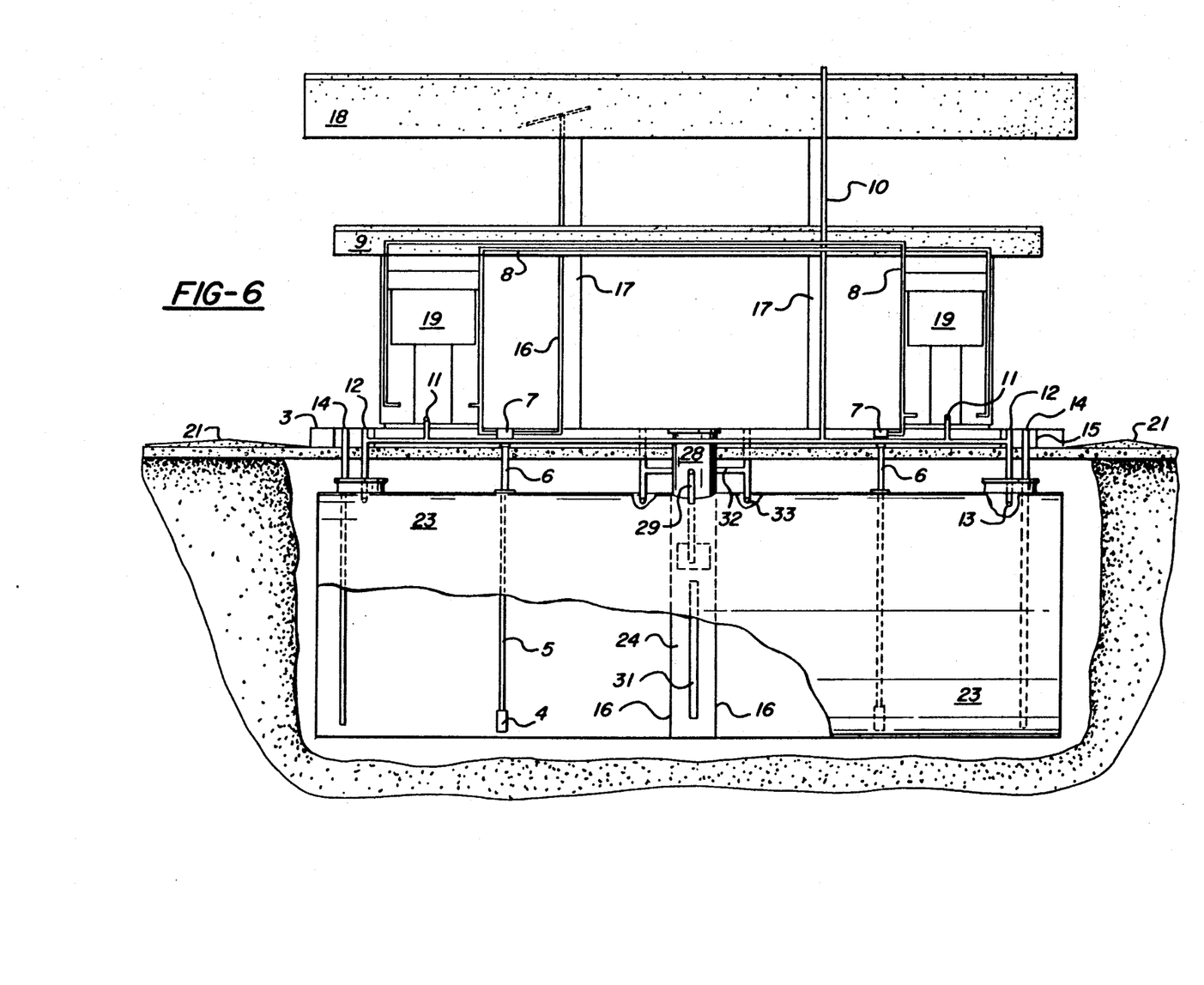
FIG. 6 is a side elevation of a service station with one underground tank and dispensing system according to the embodiment of the present invention.

FIG. 6 shows a compartmented tank located under a dispensing island 3. A submersible pump 4, discharge pipe 5 passes through and inside a riser stub 6 secured to the top of the tank, and connects to a distribution head 7 located above grade in a manhole set in the concrete dispensing island 3. Or if the concrete island 3 is in two separate parts the product pipe can be installed overhead 8 in a sub canopy 9 to reach the other dispenser.

The vent pipe 10 and vapor recover pipe 11 are part of the no underground pipe system. Vapor recovery Stage I, 12 and Stage II, 11 with float ball check valve 13 provide direct connection between tank and dispensers with minimum of piping. Thus enhancing the efficiency of the Stage II, 11 vapor recovery by reducing the amount of pipe friction in the system. No long underground vapor recovery pipes needed.

Underground tank fill pipe risers 14 terminate in manholes 15 located in the dispenser islands 3 and are above grade. They are conveniently positioned for tanker trucks to make full load deliveries without relocating. Vapor recovery Stage I, 12 truck connection is next to the underground fill pipe 14. Two bulkheads 16 forming the oil-water separator 24, divides the tank into a two product compartmented tank 23.

In a multi-island station the no underground pipe principle can be adapted to the under island tank, the T-formation compartment tank system, or the T-formation cluster tank system (see FIGS. 2, 3, 4, and 5).

Figure 8:
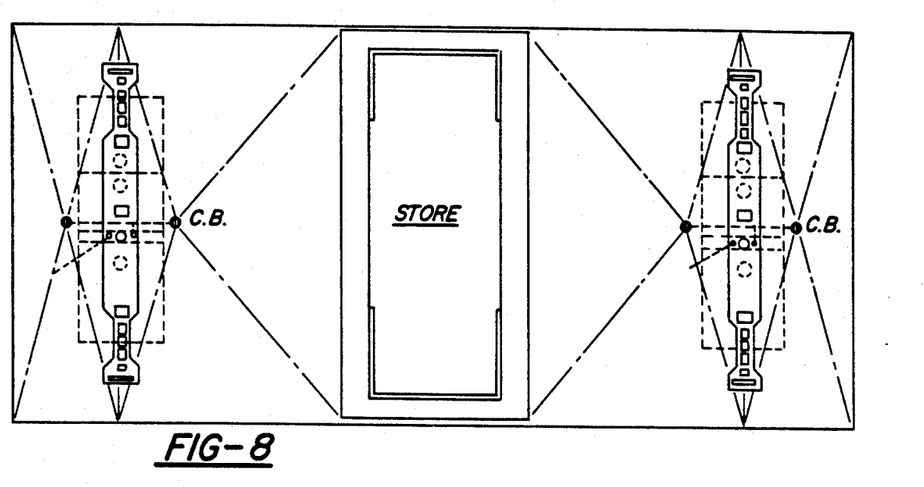
FIG. 8 is a plan view of a multi-island service station with storage tanks located under the dispenser islands according to one embodiment of the present invention.
Figure 9:
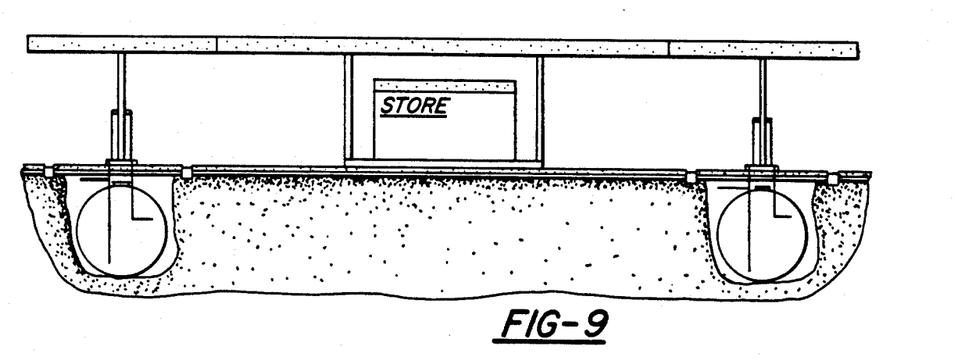
FIGS. 9 and 10 are elevation views of a multi-island service station with storage tanks located under the dispenser islands according to one embodiment of the present invention.
Figure 10:
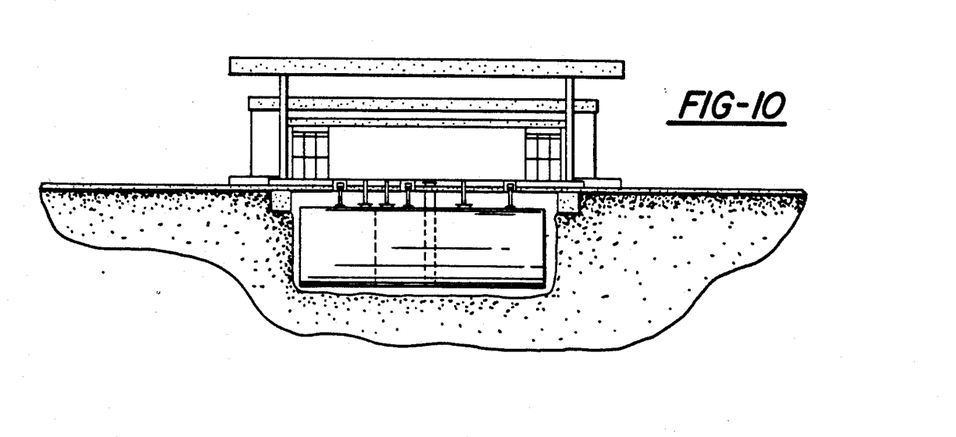

In the multi-island station using the tank under island system, tanks could be installed under each island, (see FIGS. 8, 9, and 10,) or a single large volume compartmented tank could supply several adjacent islands by directing a pipe 16 from the submersible pump distribution head 7 through a conduit in the concrete island to and up the column 17 supporting the canopy 18 then across the adjacent islands, down the column to the concrete island then horizontally to the underside of the dispenser. Or in a more advanced system all the piping per product could be routed from the distribution head 7 to the adjacent dispenser 19, then vertically through the dispenser to a sub-canopy 9 and directed up to the column 17, to the over head canopy 18, to the adjacent islands and then routed to the sub-canopy and dispensers on the adjacent islands without touching the concrete islands (see FIG. 6). This system would fit a design where all the dispensers and hose reels are mounted on the ceiling of the canopy 18 and no equipment is installed on the island or driveway.

To realize the no underground pipe distribution system benefit enjoyed by the tank under island system, the invention discards the universally used cluster system (see FIG. 1) where two or more tanks are installed parallel side-by-side and remotely located from the dispenser islands, and adopted a new invention, the T-formation system.

The T-formation compartmented tank system (see FIG. 3) and the T-formation tank cluster system (see FIGS. 4 and 5) now permits the submersible pump distribution heads for each tank to be positioned under the end of one island and above grade. The above grade piping for all the T-formation systems then follow the same patterns described for the tank under island system (see FIG. 7).

Figure 5:
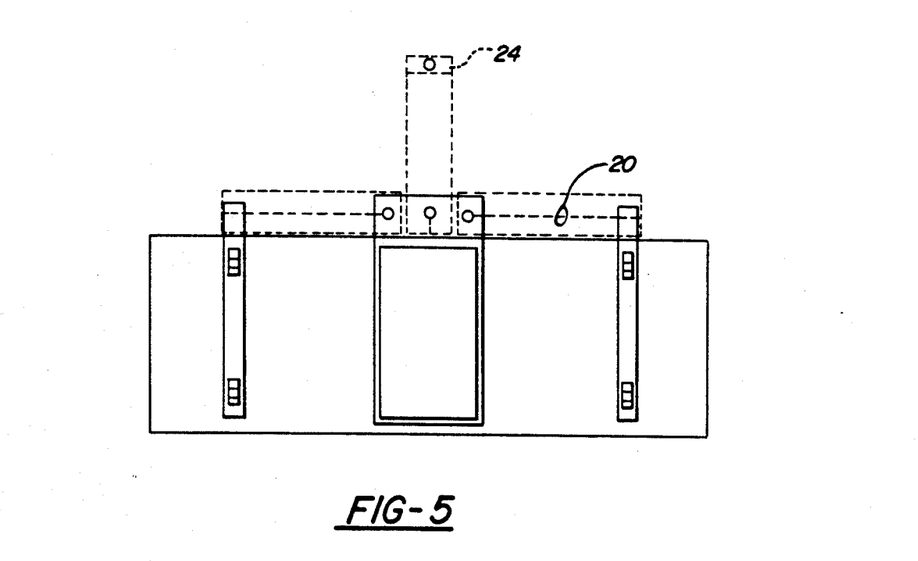
Figure 7:
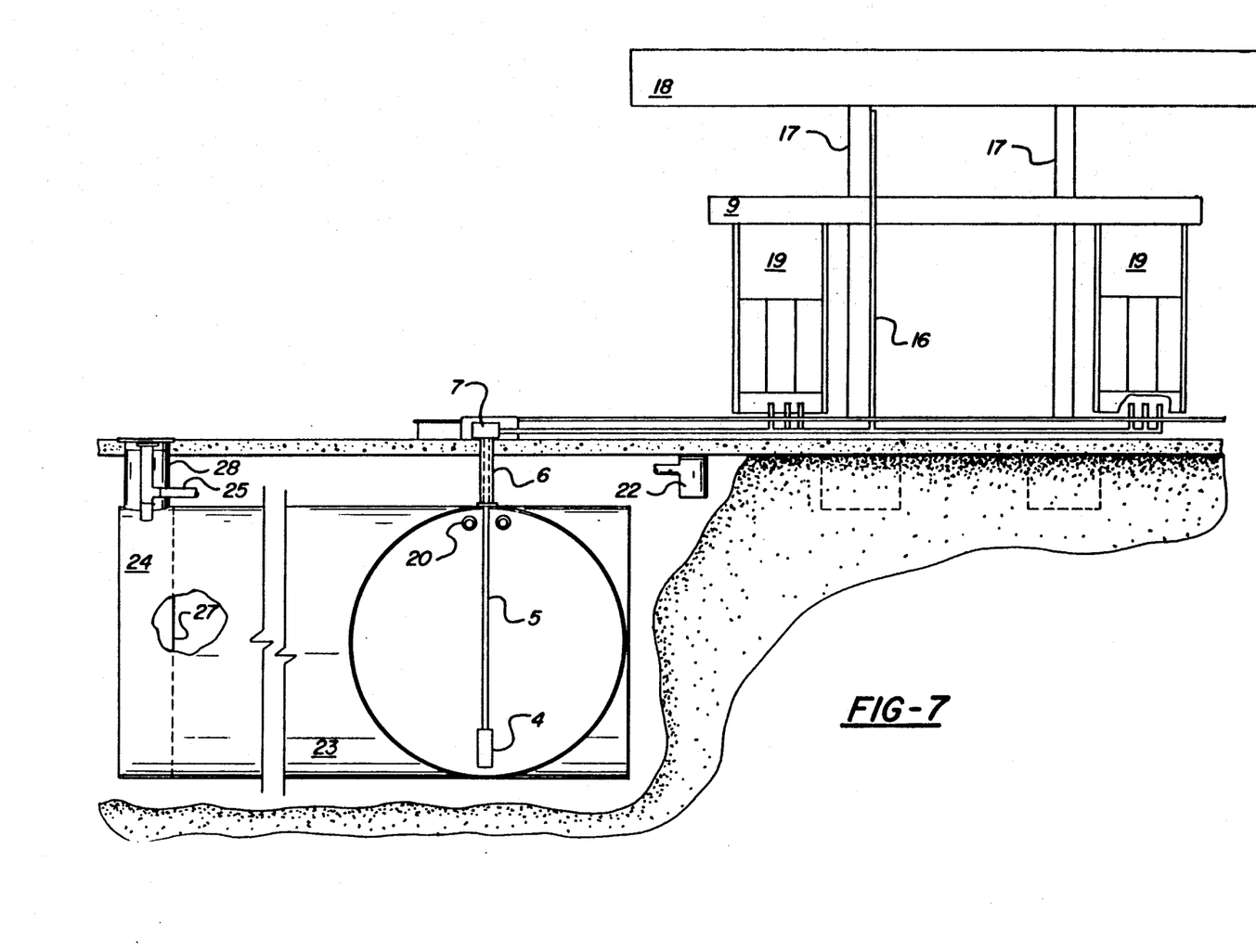
FIG. 7 is a side elevation of a service station with several underground tanks and dispensing system.

An optional T-formation system with no overhead piping in the canopy on a two or three island layout can be created by equipping the tanks that are installed perpendicular to the islands with factory installed internal piping 20 (see FIG. 5 and FIG. 7).

Each concrete island would extend over and cover the ends of the tank thus permitting the internal pipe to terminate in riser stubs in the islands and above grade. Submersible pump distribution heads discharging into these pipes route the product to and through the riser stubs and connected to the dispensers by pipes inside conduit imbedded in the concrete island.

The internal piping 20 (tubing) can pass through a conduit that is supported by hangers and located just inside the top of the tank (FIG. 7).

To handle potential spills and overfills (see FIG. 11) that occur when a tanker truck is discharging product to an underground tank or a customer is pumping product through a disperser, a quick drain system is needed to contain the spill or overfill and recover it before it flows into the ground or storm sewer and contaminates the water. This is accomplished by grading and installing the driveway around the dispenser islands and tank fill pipes to form a spill basin 21 that drains into catch basins 22 or trench drains. They in turn are connected to an oil-water separator 24 that is fabricated inside one of the underground storage tanks 23 which is part of this invention. The outlet 26 or discharge side of the oil-water separator is connected to a storm drain or drainage ditch.

Figure 11:
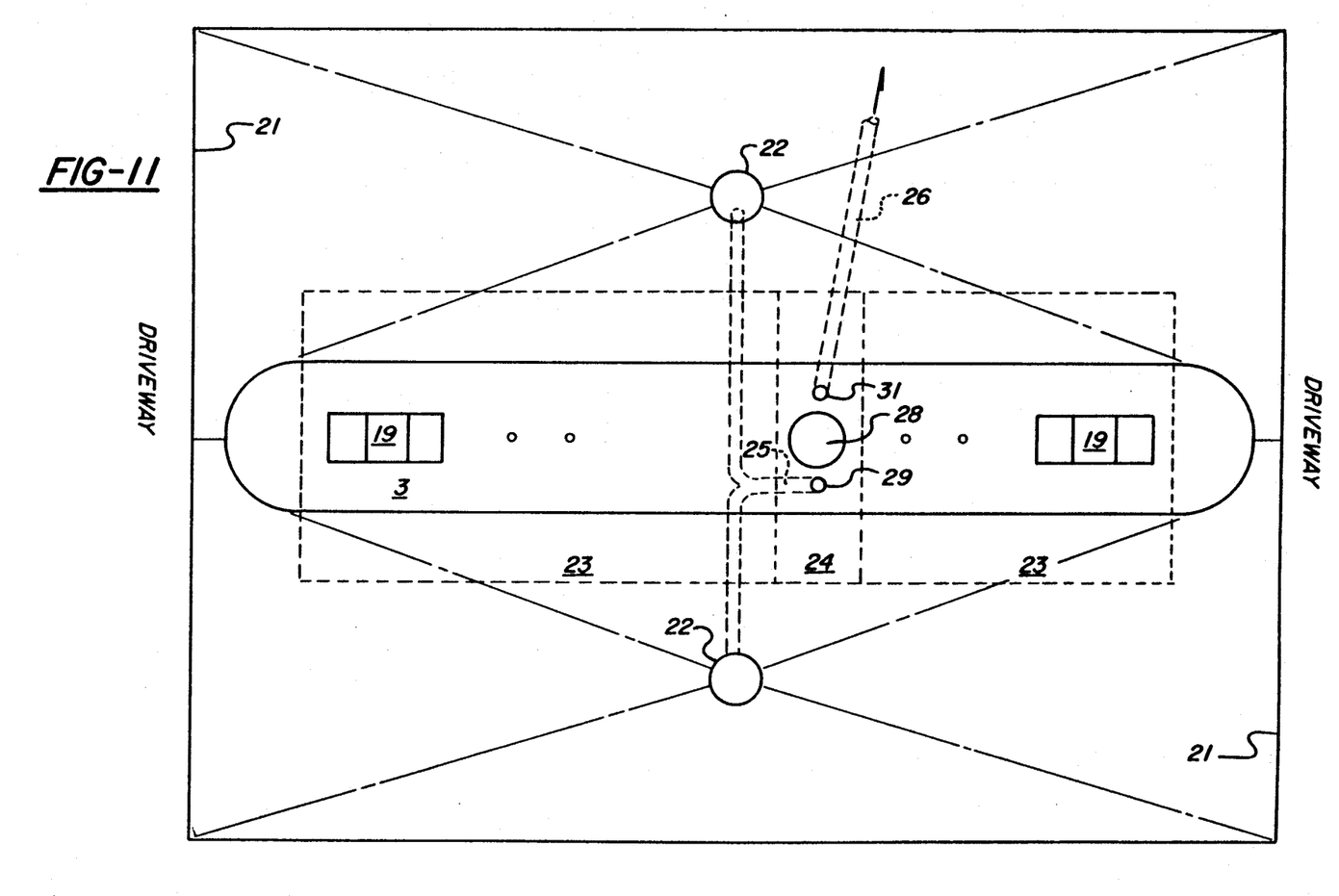
FIG. 11 is a plan view of a one island service station with combination stage tank and oil-water separator under disperser island.

This is an all gravity flow displacement system. Storm water flowing into the separator forces and equal volume of water out the discharge pipe. Spilled petroleum products will replace equivalent volumes of water and remain in the separator. Sensoring devices or visual inspection will determine when spill product should be removed and replaced with water.

Figure 15:
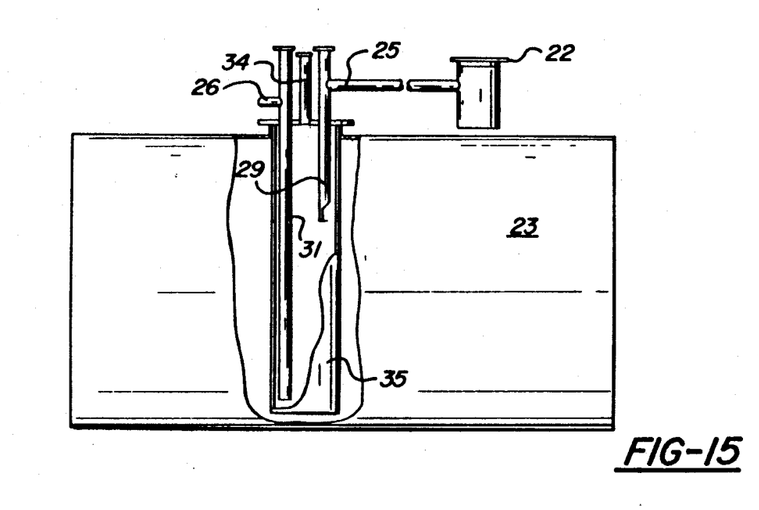
FIG. 15 is a side elevation view of a combination underground storage tank and an oil-water separator.
Figure 16:
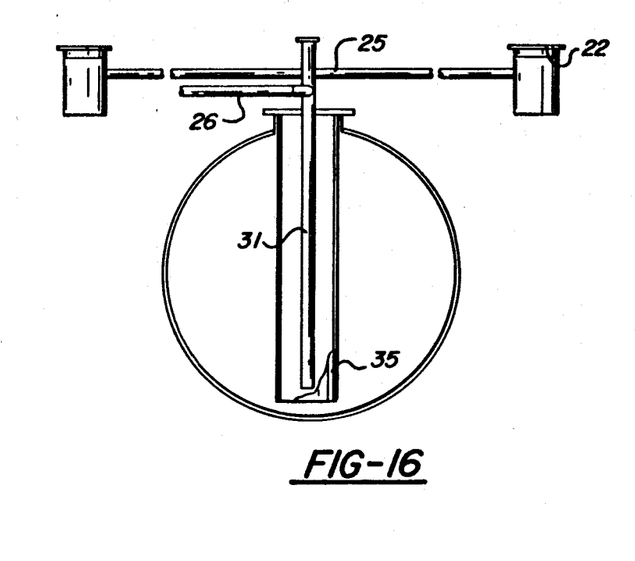
FIG. 16 is an end elevation view of a combination underground storage tank and an oil-water separator.
Figure 17:
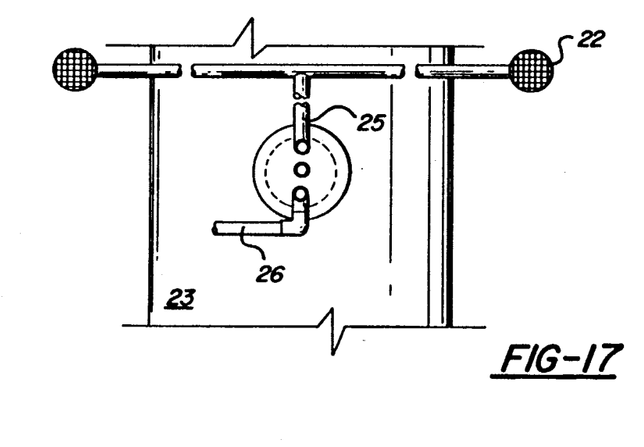
FIG. 17 is a plan view of a combination underground storage tank and oil-water separator.

The factory fabricated underground storage tank with a built in oil-water separator (see FIGS. 12 and 15) has a number of advantages over a separately designed, built and installed oil-water separator. The most advantageous feature is that when the tank 23 is installed so that is the oil-water separator 24. To make it function connect the inlet 25 side to the catch basin 22 which drains the spill basin 21 and connect the outlet 26 pipe to the storm sewer.

Since the underground tank 23 is built to meet all underwriters, state and federal regulations the built in oil-water separator 24 in no way alters the design or shape of the tank and it also meets all regulations.

Figures 12, 14:
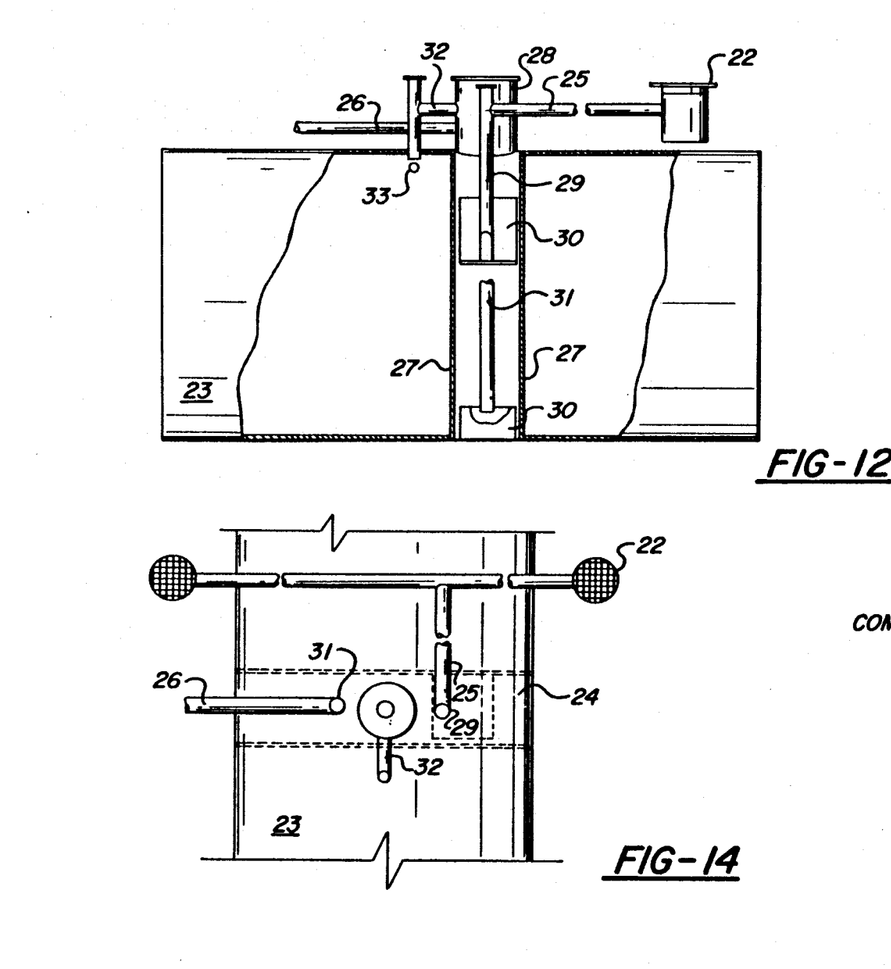
FIG. 12 is a side elevation view of a combination underground storage tank and an oil-water separator.
FIG. 14 is a plan view of a combination underground storage tank and oil-water separator.
Figure 13:
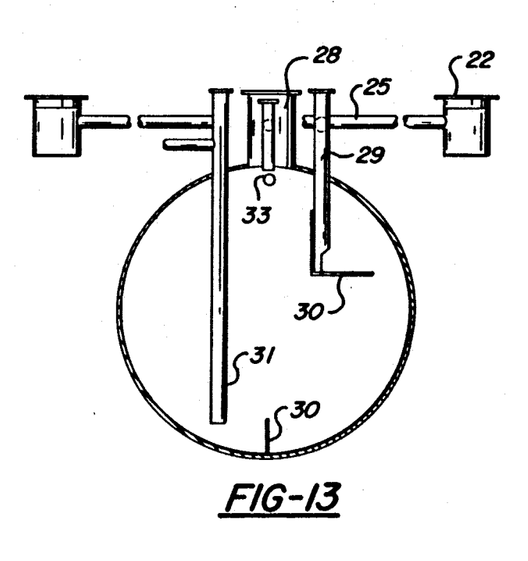
FIG. 13 is an end elevation view of a combination underground storage tank and an oil-water separator.

One method of fabricating the oil-water separator that is built into the underground storage tank is to add internal bulkheads 27 to form a separate compartment in the tank to hold the water and potential product spills. Above this compartment is installed an extended manway 28 with cover, for access and cleaning of the oil-water separator. The inlet pipe 25 is connected to a vertical drop pipe 29 that extends approximate ⅓ the distance down from the top of the tank. At the bottom end of the vertical inlet pipe are baffles 30 that slow the velocity of the incoming water or spilled product. The petroleum products float to the top of the compartment and the heavier water flows toward the bottom. A vertical discharge pipe 31 extending from a point near the bottom of the tank up through the top of the tank and connected to a outlet pipe 26 completes the liquid flow path.

The positioning of the bulkhead in the tank will determine the volume of the oil-water separator. An optional safety factor for a full tanker spill is to install a product over flow line 32 that connects the manway riser 28 to the product storage compartments 23. When the petroleum product beings to fill the oil-water separator storage compartment 24, thus displacing the water, the petroleum level rises in the manway 28, reaching the overflow pipe 32 and passes into the petroleum storage compartments. The ball float valve 33 in the over flow line prevents product from leaving the tank.

Another method of installing an oil-water separator in the underground tank is to prebuild a cylindrical container 35, (see FIG. 15) with inlet 25 and outlet 26 pipes plus clean out pipe 34 extending out of the top end, and inserting this completed assembly through a large manhole built into the top of the tank. The function of the system is the same, liquid from the spill basin enters the inlet side and the out let side discharges to a storm sewer. When all the above described systems are assembled in one compact installation we have the ultimate anti-pollution underground tank storage and dispensing system.

I claim:

1. A product dispensing station located on a grade, said product dispensing station comprising:

means for storing said product being located at a position below said grade;

means for dispensing said product being located at a position above said grade, said means for dispensing said product being operable to cause spillage of said product;

means for delivering said product from said means for storing said product to said means for dispensing said product, said means for delivering said product including:

a first portion extending from said means for storing said product, a second portion being located substantially at the level of said grade, and a third portion being located above the level of said grade, whereby said first, second and third portions are operable to deliver said product from said means for storing to said means for dispensing said product; and means for collecting said spillage of said product from said means for dispensing said product, said means for collecting being operable to contain said spillage; whereby said product dispensing station is operable to contain said spillage of said product from said means for dispensing thereby reducing environmental contamination.

2. The product dispensing station as claimed in claim 1, further comprising a product distribution device extending substantially vertically from said means for storing said product and registered in an above-grade concrete island.

3. The product dispensing station as claimed in claim 1, wherein said means for delivering said product is located substantially above said grade.

4. The product dispensing station as claimed in claim 1 wherein said means for storing said product further includes a plurality of underground storage tanks, each of said underground storage tanks are positioned such that their product distribution devices are disposed in an above-grade concrete island.

5. The product dispensing station as claimed in claim 1, wherein substantially all of said means for delivering said product being disposed above said means for dispensing said product.

6. The product dispensing station as claimed in claim 1, wherein said means for collecting said spillage of said product comprises:
means for catching said spillage,
means for separating said spillage into various constituents; and
means for transporting said spillage from said means for catching said spillage to said means for separating said spillage.

7. The product dispensing station as claimed in claim 6, wherein said means for separating said spillage is disposed within said means for storing said product.

8. The product dispensing station as claimed in claim 1, wherein said product dispensing station further comprises a means for recovering vapor from said means for dispensing said product, said means for recovering vapor being disposed proximate to said means for storing said product.

9. A product dispensing station located on a grade, said product dispensing station comprising:
means for storing said product being located at a position below said grade;
means for dispensing said product being located at a position above said grade, said means for dispensing said product being operable to cause spillage of said product;
means for delivering said product from said means for storing said product to said means for dispensing said product;
means for collecting said spillage of said product from said means for dispensing said product, said means for collecting being operable to contain said spillage; and
a concrete island being located substantially above said grade, said concrete island further being located substantially above said means for storing said product, substantially all of said means for delivering said product being located substantially at the level of said grade,
whereby said product dispensing station is operable to contain said spillage of said product from said means for dispensing thereby reducing environmental contamination.

10. The product dispensing station as claimed in claim 9, further comprising a product distribution head extending substantially vertically from said means for storing said product and registered in said concrete island.

11. The product dispensing station as claimed in claim 9 wherein said means for storing said product comprises a plurality of underground storage tanks, each of said underground storage tanks are positioned such that their product distribution heads are disposed in said concrete island.

12. The product dispensing station as claimed in claim 9, wherein substantially all of said means for delivering said product being disposed above said means for dispensing said product.

13. The product dispensing station as claimed in claim 9, wherein said means for collecting said spillage of said product comprising:
means for catching said spillage,
means for separating said spillage into various constituents; and
means for transporting said spillage from said means for catching said spillage to said means for separating said spillage.

14. The product dispensing station as claimed in claim 9, wherein said means for separating said spillage is disposed outside said means for storing said product.

15. The product dispensing station as claimed in claim 9, wherein said product dispensing station further comprises a means for recovering vapor from said means for dispensing said product, said means for recovering vapor being disposed proximate to said means for storing said product.

16. A product dispensing station located on a grade, said product dispensing station comprising:
means for directing fluids positioned within said grade;
means for accumulating fluids being located at a position substantially within said means for directing said fluids;
means for transporting said fluids from said means for accumulating fluids to a means for separating fluids; and
means for separating fluids being located at a position below said grade;
whereby said product dispensing station is operable to contain said fluids thereby reducing environmental contamination.

* * * * *

UNITED STATES PATENT AND TRADEMARK OFFICE
CERTIFICATE OF CORRECTION

PATENT NO. : 5,244,307
DATED : September 14, 1993
INVENTOR(S) : Albert L. Wokas

It is certified that error appears in the above-indentified patent and that said Letters Patent is hereby corrected as shown below:

Column 1, line 13, "failure" should be --failures--.

Column 1, line 13, "leak" should be --leaks--.

Column 1, line 25, "total" should be --totally--.

Column 1, line 36, "the" (first occurrence in patent) should be --one--.

Column 1, line 47, "stage" should be --storage--.

Column 1, line 48, "disperser" should be --dispenser--.

Column 2, line 13, "recover" should be --recovery--.

Column 2, line 46, delete "to" (second occurrence).

Column 3, line 19, "disperser" should be --dispenser--.

Column 3, line 44, delete "that".

Column 3, line 59, "approximate" should be --approximately--.

UNITED STATES PATENT AND TRADEMARK OFFICE
CERTIFICATE OF CORRECTION

PATENT NO. : 5,244,307
DATED : September 14, 1993
INVENTOR(S) : Albert L. Wokas

It is certified that error appears in the above-indentified patent and that said Letters Patent is hereby corrected as shown below:

Column 4, line 6, "beings" should be --begins--.

Column 6, line 18, Claim 13, "comprising" should be --comprises--.

Signed and Sealed this

Sixteenth Day of August, 1994

Attest:

BRUCE LEHMAN

Attesting Officer

Commissioner of Patents and Trademarks